United States Patent
Bramhill et al.

(10) Patent No.: US 10,176,067 B1
(45) Date of Patent: Jan. 8, 2019

(54) ON-DEMAND DIAGNOSTICS IN A VIRTUAL ENVIRONMENT

(71) Applicant: Amazon Technologies, Inc., Reno, NV (US)

(72) Inventors: Gavin Alexander Bramhill, Cape Town (ZA); Almero Gouws, Cape Town (ZA); Richard Alan Hamman, Cape Town (ZA); Mathew Daniel, Cape Town (ZA); Andries Petrus Johannes Dippenaar, Cape Town (ZA); Gideon Klompje, Pearl (ZA); Duncan Matthew Clough, Cape Town (ZA); Gideon Jan-Wessel Redelinghuys, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 14/290,697

(22) Filed: May 29, 2014

(51) Int. Cl.
*G06F 11/07* (2006.01)
*G06F 11/22* (2006.01)
*G06F 9/455* (2018.01)

(52) U.S. Cl.
CPC .......... *G06F 11/2294* (2013.01); *G06F 9/455* (2013.01); *G06F 11/079* (2013.01); *G06F 11/0748* (2013.01); *G06F 11/0793* (2013.01)

(58) Field of Classification Search
CPC ............... G06F 11/079; G06F 11/0748; G06F 11/0727; G06F 11/0793
See application file for complete search history.

(56) References Cited

U.S. PATENT DOCUMENTS

| | | | |
|---|---|---|---|
| 2002/0165952 A1* | 11/2002 | Sewell | H04L 41/0266 709/224 |
| 2005/0154500 A1* | 7/2005 | Sonnenrein | H04L 67/025 701/1 |
| 2006/0148550 A1* | 7/2006 | Nee, Jr. | G07F 17/32 463/16 |
| 2007/0022425 A1* | 1/2007 | Jackson | G06F 9/5027 718/104 |
| 2013/0263090 A1* | 10/2013 | Polk | G06F 11/3672 717/124 |
| 2014/0130111 A1* | 5/2014 | Nulty | H04N 17/004 725/107 |
| 2014/0310222 A1* | 10/2014 | Davlos | G06N 5/04 706/46 |

* cited by examiner

*Primary Examiner* — Jigar P Patel
(74) *Attorney, Agent, or Firm* — Klarquist Sparkman, LLP (57) ABSTRACT

Systems and methods for providing on-demand diagnostics in a virtual environment are disclosed. In one embodiment, a method comprises storing a list of approved diagnostic tests. A diagnostic service can be running in the multi-tenant environment. The diagnostic service can receive a request to run a selected diagnostic test from the list of approved diagnostic tests on one or more hardware resources in the virtual environment. In response to the request, the selected diagnostic test can be transmitted to the one or more hardware resources.

18 Claims, 8 Drawing Sheets

ON-DEMAND DIAGNOSTICS IN A VIRTUAL ENVIRONMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

A cloud computing installation may include hundreds or thousands of resources. During the lifecycle of each of these resources, the resources may fail or begin to perform poorly. Thus, it may be desirable to monitor the health and/or performance of the resources so that broken or poorly performing resources can be repaired and/or removed from service. One solution for monitoring the resources is to have a suite of diagnostic tests that periodically run on each resource. The results from the suite of diagnostic tests can be stored in a central location that can be queried for patterns and trends. Since running the suite of diagnostic tests consumes resources that can be used by customers, the diagnostic tests are typically designed to use a small amount of resources and are run infrequently.

Real-time results can be obtained when a system administrator executes ad hoc commands on suspect resources via parallel secure shell (SSH) sessions. This may be useful when attempting to identify new problems with the resources or when a more comprehensive and resource-intensive diagnostic test is desired. However, using ad hoc commands increases the risk of crashing the resource and the customer instances running on the resource. To reduce the risk of crashing the resources, a new diagnostic test typically undergoes a review process. However, it can take several weeks for the diagnostic to be reviewed, added to the existing suite of diagnostic tests, deployed on the resources, and have the results from the new diagnostic reviewed.

DETAILED DESCRIPTION

The present disclosure relates to a diagnostic service that provides on-demand diagnostics in a service provider. Diagnostic tests can include scripts and other programs suitable for measuring the health, performance, and/or usage statistics of resources of the service provider. On-demand diagnostic tests can complement a suite of diagnostic tests that are pre-loaded and periodically run on the resources of the service provider. For example, the capabilities of the suite of diagnostic tests can be limited or the results from the suite of diagnostic tests can be delayed in order to reduce the overhead subtracted from the resources available to the customer of the service provider. In contrast, on-demand diagnostic tests can be more computationally expensive (e.g., the on-demand tests can consume more resources since the tests are not run as frequently as the suite of tests) and the results can be delivered in real-time.

Using a diagnostic service to provide on-demand diagnostics can be preferable to running ad hoc commands on the resources because using ad hoc commands can increase the risk of crashing the resource and the customer instances running on the resource. For example, the diagnostic service can use approved diagnostic tests that have been peer-reviewed and/or tested for robustness. Using a diagnostic service can also provide results that are more accessible and more complete than the results from ad hoc commands. For example, the diagnostic service can provide a centrally accessible database for storing results and other information associated with the diagnostic tests. By comparison, the results from ad hoc commands can be stored in a log file, but the log file may not be accessible to others and may be missing relevant information, such as the revision of scripts that were used to diagnose a problem.

The following is an example of how the diagnostic service can be used. An engineer or administrator can diagnose a problem on an instance or resource of the service provider, such as by running a diagnostic script on the instance. Interested to see whether the same problem occurs on other instances with similar characteristics, the engineer can use the diagnostic service to have the diagnostic script executed on instances with similar characteristics. For example, the engineer may target 200 instances similar to the problem-instance to determine whether the problem occurs on like-instances. The diagnostic service can be used to store and/or display the results from running the diagnostic scripts. In one embodiment, the engineer can customize the breakdown of the results to add and/or remove dimensions (e.g., the results can be classified by hardware types, instance size, etc.). In an alternate embodiment, the diagnostics service can use statistical or other artificial intelligence techniques to automatically highlight patterns in the results.

The diagnostic service can access a scripts database used to store diagnostic scripts. The scripts database can include features for managing peer review, storage, and versioning of submitted diagnostic scripts. For example, an engineer can build a new script using ad hoc commands as a new problem is diagnosed on one of the instances. Before running the new script on hundreds of instances (and potentially crashing them), the script can be submitted to the scripts database with a request for peer review. After review and/or testing of the script, the script can be moved to a list of approved diagnostic scripts that can be launched by the diagnostic service. The process can be repeated as features are added to a script, such that older revisions of the script may be on the approved list and newer revisions of the script may be awaiting approval.

When launching a diagnostic via the diagnostic service, an engineer can specify one or more parameters corresponding to the targeted resources for the selected diagnostic script to be executed on. The parameters can include instance properties, software versions, hardware platforms, and/or a test-pool size. For example, the engineer can specify that 100 medium-sized general-purpose instances, or 10% of the compute-optimized instances, or all of the hardware platforms including a 1.0 GHz AMD OPTERON® processor are the target of the diagnostic.

The results from the executed diagnostic scripts can be gathered in the diagnostic service and displayed to a user and/or stored in a centrally accessible results database. The results can be broken down by dimension, result types, or other suitable criteria. The results database can maintain a record of all diagnostic runs and results for maintenance, management, and auditing purposes. For example, the results database can include a record of which diagnostics were run, when they run, what versions of the diagnostic tests were run, and what the results were. The results can be made available to other services of the service provider.

Figure 1:
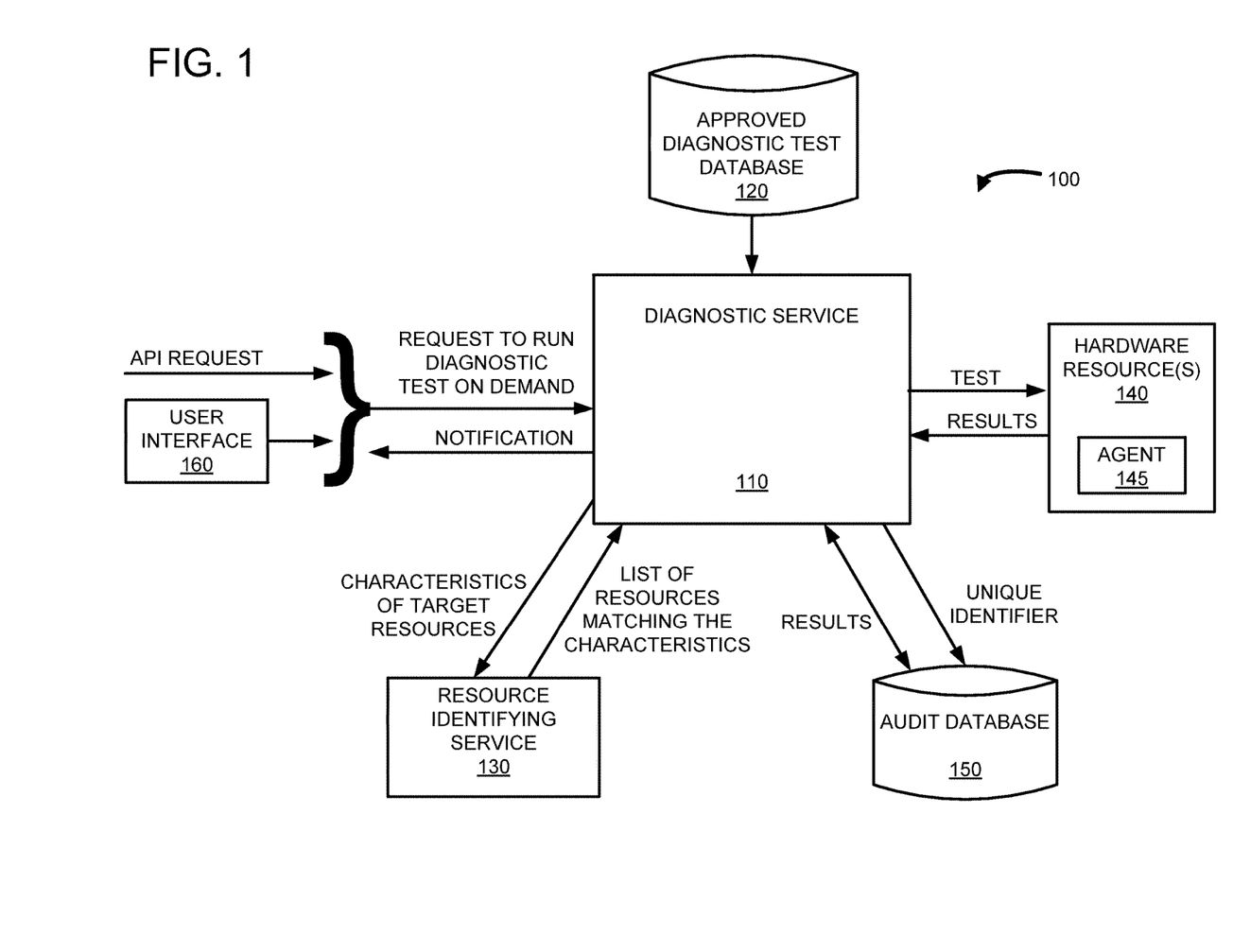
FIG. 1 is a system diagram of an embodiment for providing on-demand diagnostics in a distributed environment.

Turning to the figures, FIG. 1 illustrates a system for providing on-demand diagnostics in a distributed or cloud environment 100. The system can include a diagnostic service 110, an approved diagnostic test database 120, a resource identifying service 130, hardware resources 140, and an audit database 150. A requestor can issue a request to run a diagnostic test on demand to the diagnostic service 110. The diagnostic test can be stored on the approved diagnostic test database 120. The request can include a list of characteristics of target resources which can be used by the resource identifying service 130 to return a list of one or more resources from hardware resources 140 that match the characteristics. The diagnostic service 110 can cause the requested diagnostic test to be loaded onto and executed on one or more target resources identified by the resource identifying service 130. For example, the requested diagnostic test can be loaded onto and executed by an agent 145 of the one or more target resources. Results from the executed diagnostic tests can be returned to the diagnostic service 110. The diagnostic service 110 can store the results on the audit database 150, aggregate and process the results, and/or return the results or a report of the results to the requestor.

The approved diagnostic test database 120 can be used for storing diagnostic tests and associated data. The approved diagnostic test database 120 can include removable and/or non-removable storage, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the diagnostic service 110. The approved diagnostic test database 120 can include a relational database management system such as MYSQL™, ORACLE® Database, or MICROSOFT SQL SERVER®, for example. Generally, diagnostic tests can include scripts and other programs suitable for measuring the health, performance, and/or usage statistics of the hardware resources 140 of the distributed environment 100. Non-limiting examples of diagnostic tests include tests to measure disk usage, CPU usage, memory usage, memory corruption, network utilization, and disk access time. The diagnostic tests can be written in Perl, PowerShell, Ruby, Bash, or any other suitable scripting or programming language.

Data associated with the diagnostic tests can include a version and an approval status of the diagnostic test. One or multiple versions of a diagnostic test can be stored on the approved diagnostic test database 120 and each version of the diagnostic test can have a different approval status. Non-limiting examples of approval statuses can include a "submitted," "assigned," "approved," and "deprecated" status. For example, a new diagnostic test may be developed while debugging a problem associated with the hardware resources 140. When development of the diagnostic test is complete, the new diagnostic test can be submitted to the approved diagnostic test database 120 with an approval status of "submitted." The approval status can be changed to "assigned" when the diagnostic test is assigned to an engineer for peer review and/or testing. The approval status can be changed to "approved" when the peer review and/or the testing of the diagnostic test is complete and the diagnostic test is approved to be launched on the fleet of hardware resources 140. The approval status can be changed to "deprecated" when a newer or different version of the diagnostic test is the preferred version of the diagnostic test.

Data associated with a diagnostic test can include developer or user-supplied information, such as comments regarding the usage of the test, known problems of the test, objectives of the test, and a rating for the test. In one embodiment, the approval status can be based on one or more ratings for the test. For example, an approved test that receives more than a threshold amount of negative ratings can be changed to a "probation" status and removed from the list of the approved tests.

Data associated with the diagnostic tests can include a list of authorized users or a privilege level of the diagnostic test. In other words, some users may not have permission to run all versions of all diagnostic tests. For example, users can be assigned a privilege level where lower privilege levels correspond to greater access, and only users with a privilege level less than or equal to the privilege level associated with the diagnostic test can run the diagnostic test. As another example, users may be assigned to one or more groups, and only certain groups may be allowed to run certain diagnostic tests.

The hardware resources 140 can include a homogeneous or a heterogeneous set of resources located in one or more data centers or availability zones. For example, the hardware resources 140 can include computing, networking, and storage resources. Computing resources can include different types, such as general-purpose instances, compute-optimized instances, memory-optimized instances, storage-optimized instances, input-output-optimized instances, micro-instances, and instances with co-processors. As an example, compute-optimized instances can be optimized for longer CPU-intensive loads and micro-instances can be optimized for shorter, more bursty loads. The hardware resources 140 can include instances of different sizes, such as small, medium, large, and extra-large. The hardware resources 140 can include different platforms such as AMD OPTERON® processors and INTEL XEON® processors of different frequencies, for example. The hardware resources 140 can include resources loaded with different types and/or versions of software. The hardware resources 140 can be characterized by different usage classes, such as production resources or spare capacity, and by different mutually exclusive or overlapping states, such as newly-launched, available, suspended, and on-probation.

The diagnostic service 110 and the resource identifying service 130 can be web services accessed via an application programming interface (API) request or via a user interface 160. Web services are commonly used in cloud computing. A web service is a software function provided at a network address over the web or the cloud. Clients initiate web service requests to servers and servers process the requests and perform appropriate actions and/or return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can perform a specific action and generate a response to the request and send the response to the endpoint identified in the request. For example, a user can access the diagnostic service 110 via an API request to run a diagnostic test on demand, the diagnostic service 110 can cause the requested diagnostic test to be loaded onto and executed on the hardware resources 140, results can be returned to the diagnostic service 110, and the diagnostic service 110 can send a response to the user.

The diagnostic service 110 can be accessed via the user interface 160. The user interface 160 can include a graphical user interface (GUI), for example. The user interface 160 can include interactive content and the user interface 160 can provide feedback to the user through the interactive content. For example, the user interface 160 can present a list of approved tests, and the user may select one or more tests from the list to run. As another example, the user interface 160 can present data associated with the approved tests, such as comments or ratings for the tests, so that the user can evaluate whether to run the test based on the associated data. The user interface 160 can authenticate a user of the on-demand diagnostics, such as by using a login and a password. Each user can be assigned a unique user identifier and may be assigned to one or more groups. The list of approved tests presented to the user can be based on the identity of the user. For example, the user interface 160 or the diagnostic service 110 can compare the user identity to a list of authorized users associated with each diagnostic script, and only display diagnostic scripts that the user is authorized to run. Similarly, the target resources accessible by the user can be based on the identity of the user, such as by associating a list of authorized users or groups with each resource, and comparing the user identity or group to the authorized users or groups of each resource.

The user interface 160 can provide a list of parameters corresponding to target resources accessible by the user. The parameters can include an instance type, a software version, a hardware platform, a usage class, or a server computer state, for example. As the user selects the one or more parameters, the user interface 160 can display the number of target resources matching the parameters and/or an estimated time to complete the diagnostic tests for the selected target resources. Based on the number of matching target resources or the estimated time to complete the diagnostics, the user can refine the parameters or set a test pool size to generate diagnostics that match the user's time-budget for running the diagnostics. In one embodiment, the user interface 160 can retrieve the data about the target resources by generating an asynchronous request to the diagnostic service 110, which can request the data from the resource identifying service 130. In an alternate embodiment, the user interface 160 can communicate directly with the resource identifying service 130. The user interface 160 can also provide a user access to the results from the diagnostic tests.

The request to run a diagnostic test on demand can be an API request or a request generated by the user interface 160, and the request can include a user identifier, one or more diagnostic tests to execute, one or more parameters or characteristics associated with target resources, a test pool size, a launch time or condition for launching, and a response-type. The user identifier can be associated with a user or a service, for example. The test pool size can set an absolute or relative number of resources to run the diagnostic tests on. For example, the test pool size can be 100 resources or 10% of the resources matching the identified characteristics. The diagnostic tests on demand can be launched as soon as the request is received or at a later time that is specified by the user. For example, the diagnostic tests can be launched at a predetermined scheduled time, such as when a new set of resources are scheduled to go on-line. As another example, the diagnostic tests can be launched by a triggering event, such as when an alarm condition is detected on a resource. The response-type can specify that results are to be stored only on the audit database, that results are to be delivered to the user interface 160 or another service, or that a notification that the diagnostics are complete should be sent to a user or service associated with the request, for example.

The diagnostic service 110 can verify that a user is authorized to download and execute (e.g., launch) the diagnostic test on the targeted hardware resources 140 prior to launching the diagnostic test. For example, the diagnostic service 110 can compare a user identifier of the request to a list of authorized users associated with the diagnostic test and a list of authorized users associated with each of the targeted hardware resources 140, and only launch the diagnostic test if the user is an authorized user of the diagnostic test and the targeted hardware resources 140. As another example, the diagnostic service 110 can determine a privilege level associated with a user identifier of the request, and only launch the diagnostic test if the user's privilege level is less than or equal to a privilege level associated with the diagnostic test and the targeted hardware resources 140.

The diagnostic service 110 can cause the diagnostic script to be loaded onto and executed on the targeted hardware resources 140. In one embodiment, the diagnostic service 110 can communicate with one or more agents, such as the agent 145, to transmit the diagnostic script to the hardware resources 140. The agent 145 can be running in a management layer of the hardware resources 140. For example, the agent 145 can be software running in a privileged domain of a hypervisor running on a server computer of the hardware resources 140. The diagnostic service 110 can dynamically download the diagnostic test to the agent 145 by retrieving the diagnostic test from the approved diagnostic test database 120 and transmitting the diagnostic test to the agent 145. In one embodiment, the diagnostic can be transmitted to the agent 145 over a secure authenticated channel. The agent 145 can receive the transmitted diagnostic script, cause the diagnostic script to be executed on the hardware resources 140, and return results from the executed diagnostic script back to the diagnostic service 110. In an alternative embodiment, the diagnostic service 110 can download the diagnostic test via one or more intermediary services. For example, the diagnostic service 110 can retrieve the diagnostic test from the approved diagnostic test database 120 and transmit the diagnostic test to an intermediary service that communicates with the agent 145. The agent 145 can send results from the executed diagnostic script to the intermediary service, which can pass the results back to the diagnostic service 110.

The diagnostic service 110 can receive results from the diagnostic script executed on the hardware resources 140, store the results in the audit database 150, and allow access to the results. Allowing access to the results can include providing access to the results through the diagnostic service 110, or by providing a pointer to the results in the audit database 150 so that the results can be accessed without the diagnostic service 110. The audit database 150 can include removable and/or non-removable storage, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the diagnostic service 110. The audit database 150 can include a relational database management system such as MYSQL™, ORACLE® Database, or MICROSOFT SQL SERVER®, for example.

The results can be stored with additional data to determine information such as, which diagnostics are being executed, who or which groups are executing the diagnostics, when are the diagnostics being executed, and what are the targets of the diagnostics. The additional data can include a unique identifier, version numbers of any diagnostic tests that were executed, the user identifier associated with the user running the diagnostics, the date and time when the diagnostics were run, a list of the target resources where the diagnostics were run, and any other information that is suitable for auditing, maintaining, or managing the diagnostic service and/or the hardware resources 140. For example, the diagnostic service 110 can generate a unique identifier associated with each launch of a selected diagnostic script so that the results can be later retrieved from the audit database 150 by querying for all of the results associated with the unique identifier.

The diagnostic service 110 can process the results or leave the results unprocessed. For example, the results can be categorized by a hardware platform, an instance size, or any other parameter of the hardware resources 140. As another example, results can be categorized by an exit code of the diagnostic script. As yet another example, failures can be correlated to one or more parameters of the hardware resources 140 to determine if some aspect of the hardware resources 140 is causing or is susceptible to problems detected by the selected diagnostic test.

The diagnostic service 110 can send a notification that the diagnostics have completed and that the results have been aggregated and/or stored. Sending a notification can include updating the graphical user interface 160, sending an email to the user associated with running the diagnostics, or sending a message to a queue of service associated with running the diagnostics. The notification can include the unique identifier associated with the results, a process identifier associated with the request to run the diagnostics, a link to the results, or a summary of the results, for example. Thus, the notification can provide access to the results by providing the summary of the results or the identifier or link to the results. In one embodiment, the diagnostic service 110 can send the notification to the user or service directly. In an alternate embodiment, the diagnostic service 110 can use an intermediary service to send the notification to the user or service.

Figure 2:
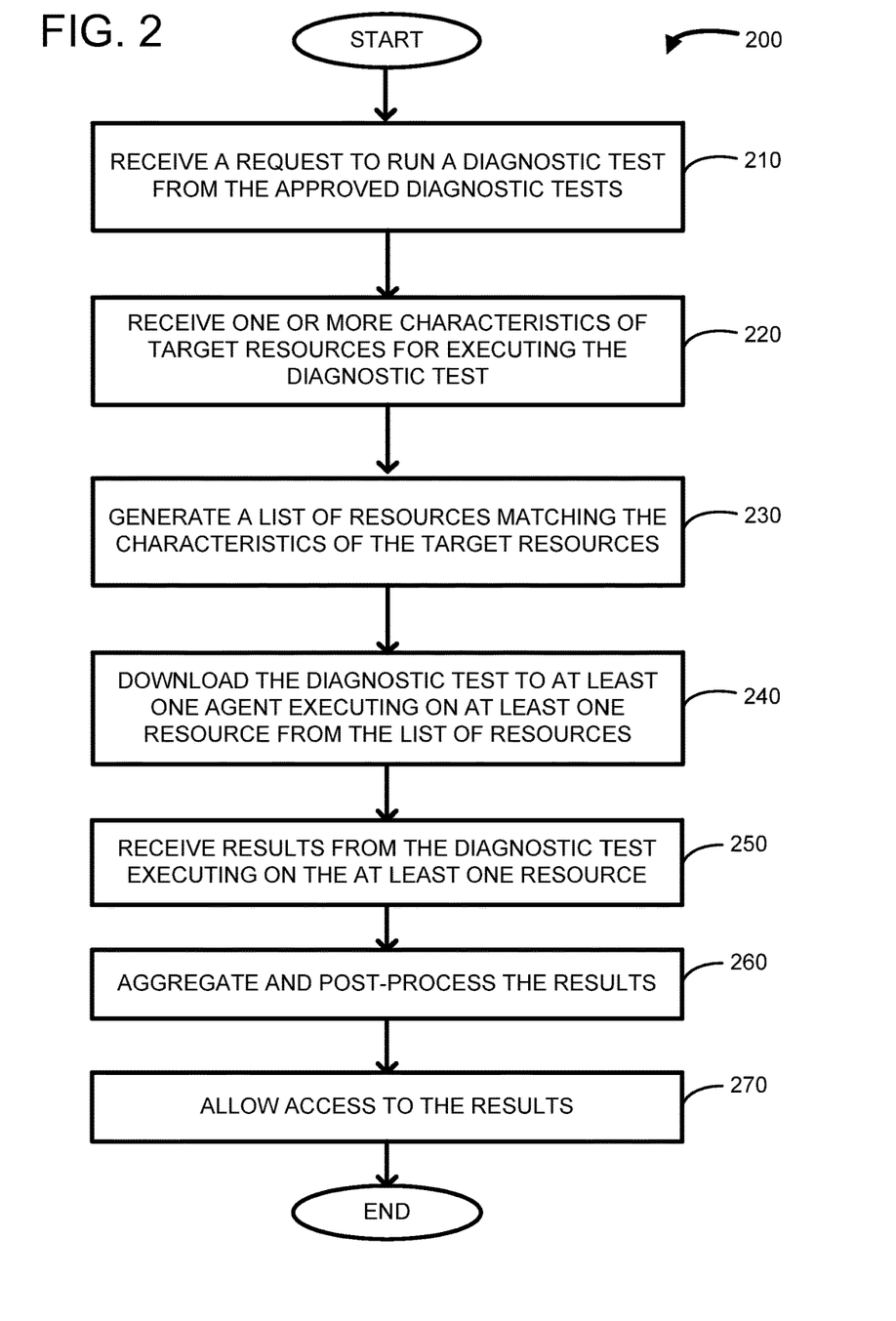
FIG. 2 is a flowchart of a method for providing on-demand diagnostics in a distributed environment, according to one embodiment.

FIG. 2 is a flowchart of a method 200 for providing on-demand diagnostics in a distributed environment, such as the distributed environment 100 of FIG. 1. At 210, a request can be received to run a diagnostic test from the approved diagnostic tests. The approved diagnostic tests can be stored on the approved diagnostic test database 120 along with information that is associated with the approved diagnostic tests. In one embodiment, the diagnostic service 110 can receive the request to run the diagnostic test and determine whether the requestor is authorized to execute the requested diagnostic test. For example, the request can include a user identifier, and the diagnostic service 110 can compare the user identifier to a list of authorized users for the diagnostic test. The list of authorized users for the diagnostic test can be stored in association with the diagnostic test on the approved diagnostic test database 120. If the user is not authorized to run the diagnostic test, the diagnostic service 110 can block the user from running the diagnostic test.

At 220, one or more characteristics of target resources for executing the diagnostic test can be received. Non-limiting examples of the characteristics include instance properties, software versions (either operating systems or application programs), hardware platforms, availability zones, usage classes, and hardware states. The characteristics can be included with the request to run a diagnostic test from the approved diagnostic tests or the characteristics can be received separately from the request to run the diagnostic test. For example, an API request can include one or more diagnostic tests to run, characteristics of the target resources, a user identifier, and other information suitable for accessing and using the diagnostic service. As another example, a GUI, such as the user interface 160, can present a user with lists of approved tests and characteristics of target resources, and the user can select from the lists in multiple steps prior to launching the diagnostics. For example, a first request can be sent to the diagnostic service 110 when the user selects a diagnostic test, and a second request can be sent to the diagnostic service 110 when the user selects one or more characteristics of target resources for executing the diagnostic test.

At 230, a list of resources matching the characteristics of the target resources can be generated. In one embodiment, a service, such as the resource identifying service 130, can be used to return the list of resources in response to a request with the characteristics of the target resources. The list of resources can include all resources matching the characteristics of the target resources or a subset of the resources matching the characteristics of the target resources. For example, the list of resources can be limited to a predetermined maximum number of resources. As another example, the list of resources can be limited to a set of resources that the user is authorized to access. As yet another example, the list of resources can be limited to the number of resources specified in a test pool size that is provided to the resource identifying service 130. As yet another example, the list of resources can include a percentage of all of the resources matching the characteristics of the target resources. The percentage can be fixed, such as 50% of the matching resources, or the percentage can vary based on the number of resources matching the characteristics of the target resources. For example, the list can include a larger percentage of the resources when a small number of resources match the characteristics of the target resources, and the list can include a smaller percentage of the resources when a large number of resources match the characteristics of the target resources.

When the list of resources is less than the maximum number of resources matching the characteristics of the target resources, any suitable algorithm can be used to pick the subset of resources. For example, the subset of resources can be selected randomly from all of the resources. As another example, the subset of resources can be selected from the resources that are the most lightly utilized when the list is requested. As yet another example, the resources that have been least recently used for diagnostic testing can be selected.

At 240, the selected diagnostic test can be downloaded to at least one agent executing on at least one resource from the list of resources. In one embodiment, the diagnostic service 110 can select the resource to download the diagnostic test to, from one of the list of resources from 230, using an algorithm as described above. In another embodiment, a service for selecting the list of resources matching the characteristics of the target resources, such as the resource identifying service 130, can select all of the resources to download the diagnostic test to. The diagnostic test can be downloaded by retrieving the diagnostic test from the approved diagnostic test database 120, and transmitting the diagnostic test to an agent, such as agent 145, on the targeted resource. The agent 145 can receive the diagnostic test, schedule the diagnostic test to be executed on the targeted resource, gather any results from the diagnostic test, and transmit the results back to the diagnostic service 110.

At 250, results are received from the diagnostic test executing on the at least one resource from the list of resources. In one embodiment, the diagnostic service 110 receives the results from the agent 145 executing on the hardware resources 140. The results can include an exit code or status of the diagnostic test, a file, a link to a file, an XML-formatted document, or a message, for example. The results can be stored in a database, such as the audit database 150, for example. The results can be stored in association with additional information that is suitable for auditing, maintaining, or managing the diagnostic service and/or the hardware resources 140. The additional information can include a unique identifier, version numbers of any diagnostic tests that were executed, the user identifier associated with the user running the diagnostics, the date and time when the diagnostics were run, and a list of the target resources where the diagnostics were run, for example.

At 260, the results can be aggregated and post-processed. Statistical or other artificial intelligence techniques can be used to automatically highlight patterns in the results. For example, the results can be aggregated and categorized by one or more parameters of the hardware resources 140, such as a hardware platform, an instance size, a version of software loaded on the hardware resources 140, or any other parameter of the hardware resources 140. The results can be correlated to the one or more parameters of the hardware resources 140 to determine if some aspect of the hardware resources 140 is causing or is susceptible to problems detected by the diagnostics.

At 270, access to the results can be allowed. In one embodiment, the diagnostic service 110 can allow access to the results. For example, the diagnostic service 110 can gather and forward results from the executed diagnostic test in response to the request to run the diagnostic tests on demand. The results can be returned as a response to an API request to execute the diagnostic test on the targeted resource. The results can be returned as content displayed on the user interface 160. As another example, the diagnostic service 110 can gather and store results from the executed diagnostic test in a database, such as the audit database 150. A request to the diagnostic service 110 can cause the diagnostic service 110 to retrieve the results from the audit database 150. For example, a user may query the diagnostic service 110 for results associated with a unique identifier associated with a diagnostic run, and the diagnostic service 110 can retrieve the results from the audit database 150 and return the results to the user.

Figure 3:
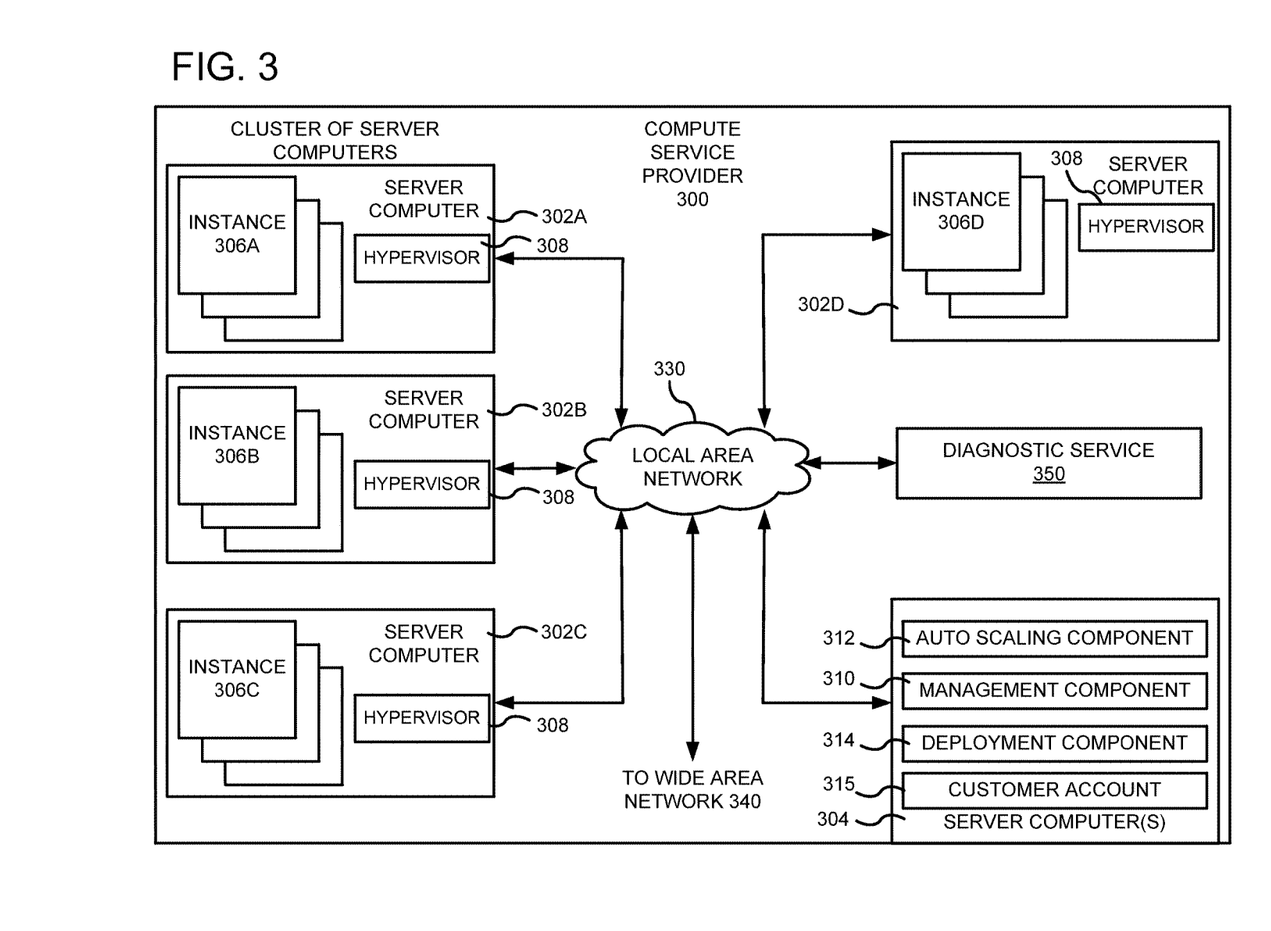
FIG. 3 is an example system diagram showing a plurality of virtual machine instances running in the multi-tenant environment.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

A diagnostic service 350 can be used to provide on-demand diagnostics in the compute service provider 300. The diagnostic service 350 can store diagnostic scripts in a scripts database. The diagnostic service 350 can receive a selection of a diagnostic script to execute and one or more parameters corresponding to at least one target resource for the selected diagnostic script to be executed on. The target resources can be one or more of the server computers 302A-302D. The diagnostic service 350 can cause the selected diagnostic script to be loaded onto and executed on the at least one target resource corresponding to the one or more parameters. For example, the selected diagnostic script can be retrieved from the scripts database, and transmitted over the local area network 330 to one or more of the server computers 302A-302D corresponding to the one or more parameters. Each of the server computers 302A-302D can include an agent configured to receive the downloaded diagnostic script and execute the diagnostic script on the corresponding server computer. The agent can be the hypervisor 308, a program executing in a privileged domain on the server computer, or a program executing in a virtual machine instance, such as instances 306A-306D. The diagnostic script can execute in the privileged domain or on a virtual machine instance. The agent can transmit the results from the executed diagnostic script over the local area network 330 to the diagnostic service 350. The diagnostic service 350 can receive the results, store the results in an audit database, and allow access to the results, such as by responding to a query or request for the results.

Figure 4:
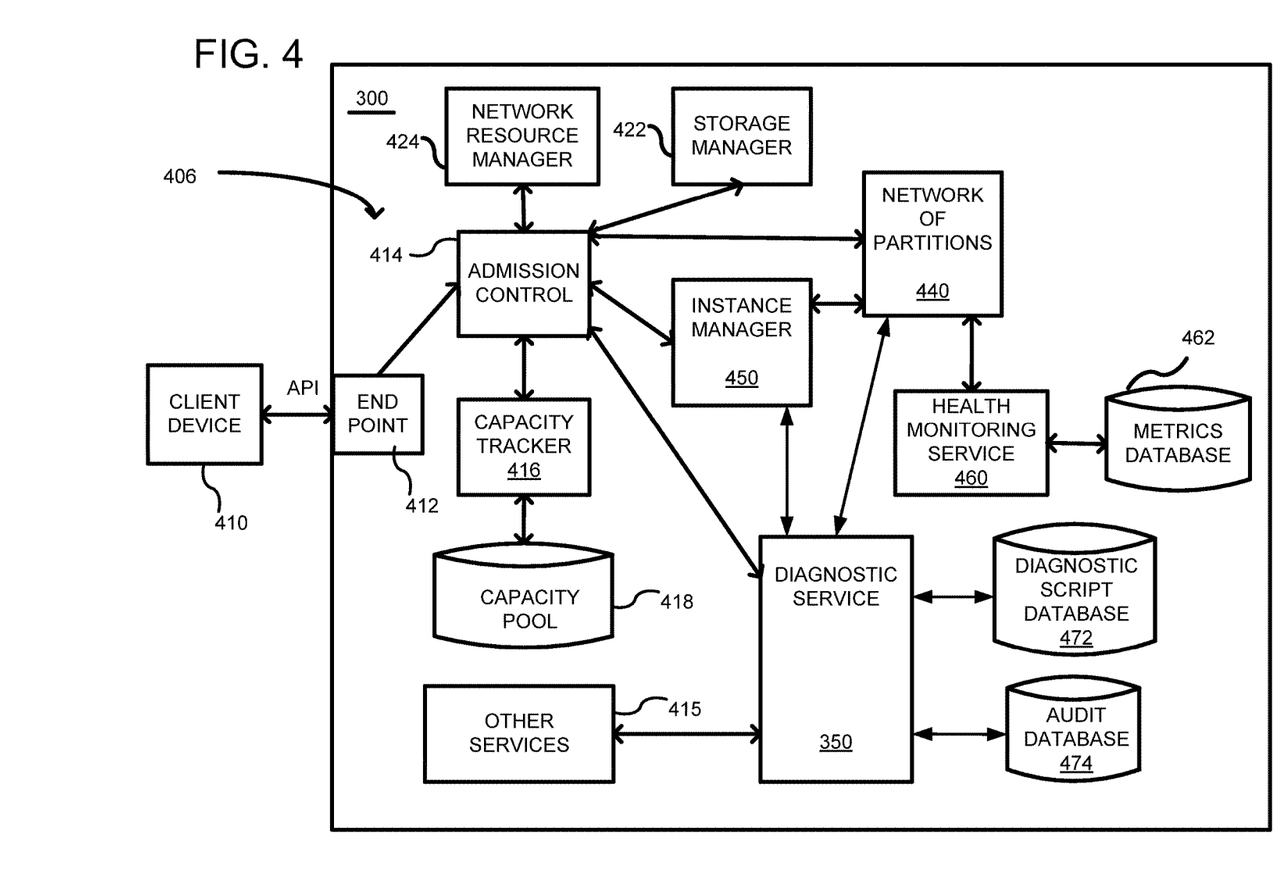
FIG. 4 shows further details of an example system including a plurality of management components associated with a control plane.

FIG. 4 illustrates in further detail management components 406 that can be used in the multi-tenant environment of the compute service provider 300. In order to access and utilize instances (such as instances 306 of FIG. 3), a client device can be used. The client device 410 can be any of a variety of computing devices, mobile or otherwise including a cell phone, smartphone, handheld computer, Personal Digital Assistant (PDA), desktop computer, etc. The client device 410 can communicate with the compute service provider 300 through an end point 412, which can be a DNS address designed to receive and process API requests. In particular, the end point 412 can be a web server configured to expose an API. Using the API requests, a client 410 can make requests to implement any of the functionality described herein.

Other general management services that may or may not be included in the compute service provider 300 include an admission control 414, e.g., one or more computers operating together as an admission control web service. The admission control 414 can authenticate, validate and unpack the API requests for service or storage of data within the compute service provider 300. The capacity tracker 416 is responsible for determining how the servers need to be configured in order to meet the need for the different instance types by managing and configuring physical inventory in terms of forecasting, provisioning and real-time configuration and allocation of capacity. The capacity tracker 416 maintains a pool of available inventory in a capacity pool database 418. The capacity tracker 416 can also monitor capacity levels so as to know whether resources are readily available or limited. An instance manager 450 controls launching and termination of instances in the network. When an instruction is received (such as through an API request) to launch an instance, the instance manager pulls resources from the capacity pool 418 and launches the instance on a decided upon host server computer. Similar to the instance manager are the storage manager 422 and the network resource manager 424. The storage manager 422 relates to initiation and termination of storage volumes, while the network resource manager 424 relates to initiation and termination of routers, switches, subnets, etc. A network of partitions 440 is described further in relation to FIG. 5 and includes a physical layer upon which the instances are launched.

A health monitoring service 460 can provide monitoring for resources and the applications customers run on the compute service provider 300. System administrators can use the monitoring service 460 to collect and track metrics, and gain insight to how applications are running. For example, the monitoring service 460 can allow system-wide visibility into application performance and operational health. Metrics generated by the health monitoring service 460 can be stored in the metrics database 462.

A diagnostic service 350 can provide on-demand diagnostics in the compute service provider 300. The diagnostic service 350 can store diagnostic scripts in a scripts database 472. The diagnostic service 350 can receive a selection of a diagnostic script to execute and one or more parameters corresponding to at least one target resource for the selected diagnostic script to be executed on. For example, the selection of the diagnostic script and the one or more parameters can be part of an API request from client device 410 or other services 415. The diagnostic service 350 can verify that a user identified with the request is authorized to execute the selected diagnostic script on resources with the selected parameters. If the user is authorized to execute the diagnostic script, the diagnostic service 350 can cause the requested diagnostic script to be loaded onto and executed on one or more target resources identified by the instance manager 450. The instance manager 450 can provide a list of resources matching the selected parameters and the diagnostic service 350 can select all or a subset of resources to execute the diagnostic script on. The diagnostic script can be downloaded to and executed on the network of partitions 440. Results from the executed diagnostic script can be transmitted from the network of partitions 440 and received by the diagnostic service 350. The diagnostic service 350 can store the results in an audit database 474, and allow access to the results, such as by responding to a query or request for the results.

Figure 5:
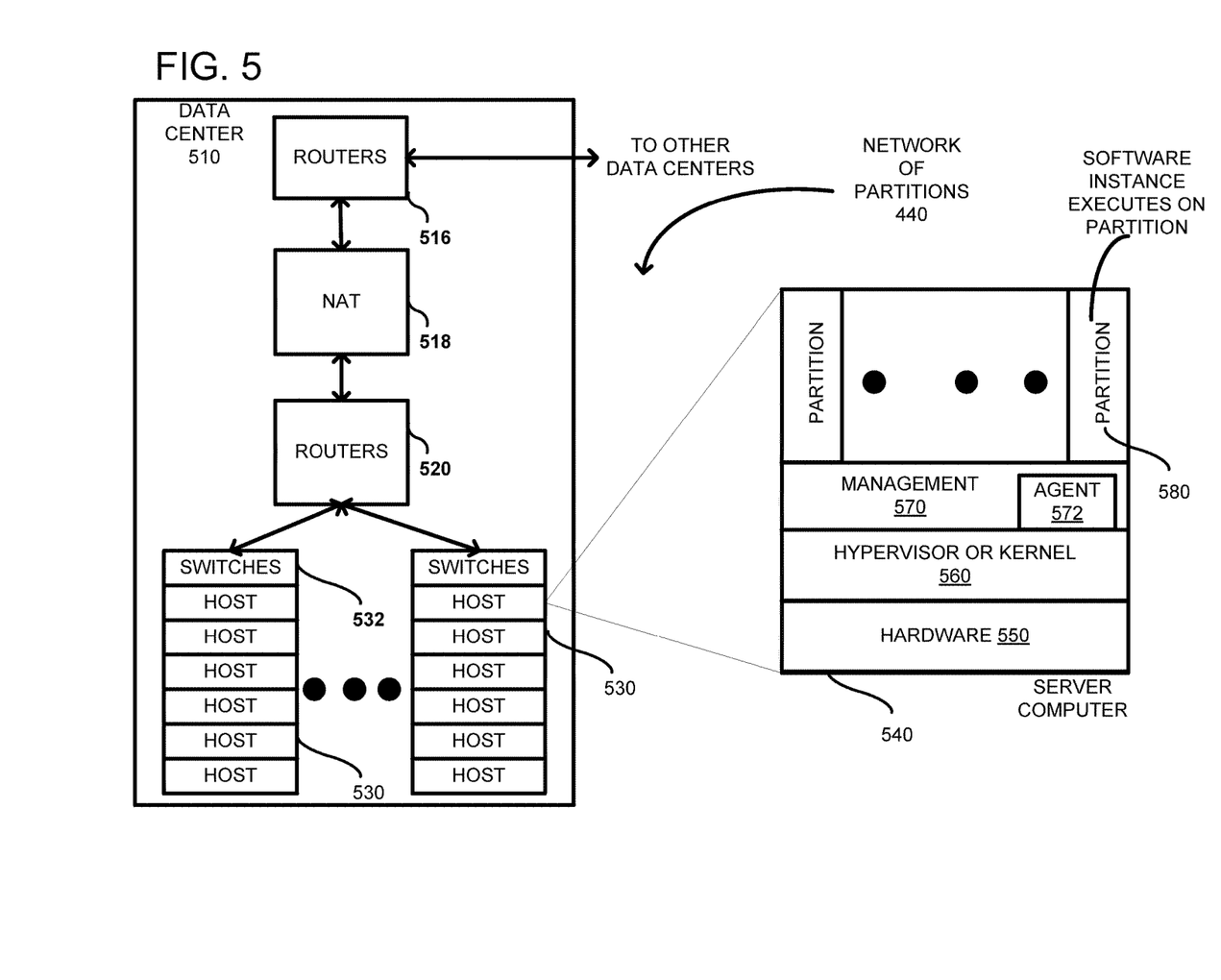
FIG. 5 shows an example of a plurality of host computers, routers and switches, which are hardware assets used for running virtual machine instances.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The management layer 570 can include an agent 572 for communicating with the diagnostic service 350 and for causing diagnostic scripts to be executed on the host 540. The partitions 580 are logical units of isolation by the hypervisor. Each partition 580 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Each partition can also include an agent for communicating with the diagnostic service 350 and for causing diagnostic scripts to be executed on the host 540.

Any applications executing on the instances can be monitored using the management layer 570, which can then pass the metrics to the health monitoring service 560 for storage in the metrics database 562. Additionally, the management layer 570 can pass to the monitoring service 460 the number of instances that are running, when they were launched, the operating system being used, the applications being run, etc. All such metrics can be used for consumption by the health monitoring service 460 and stored in database 462.

Figure 6:
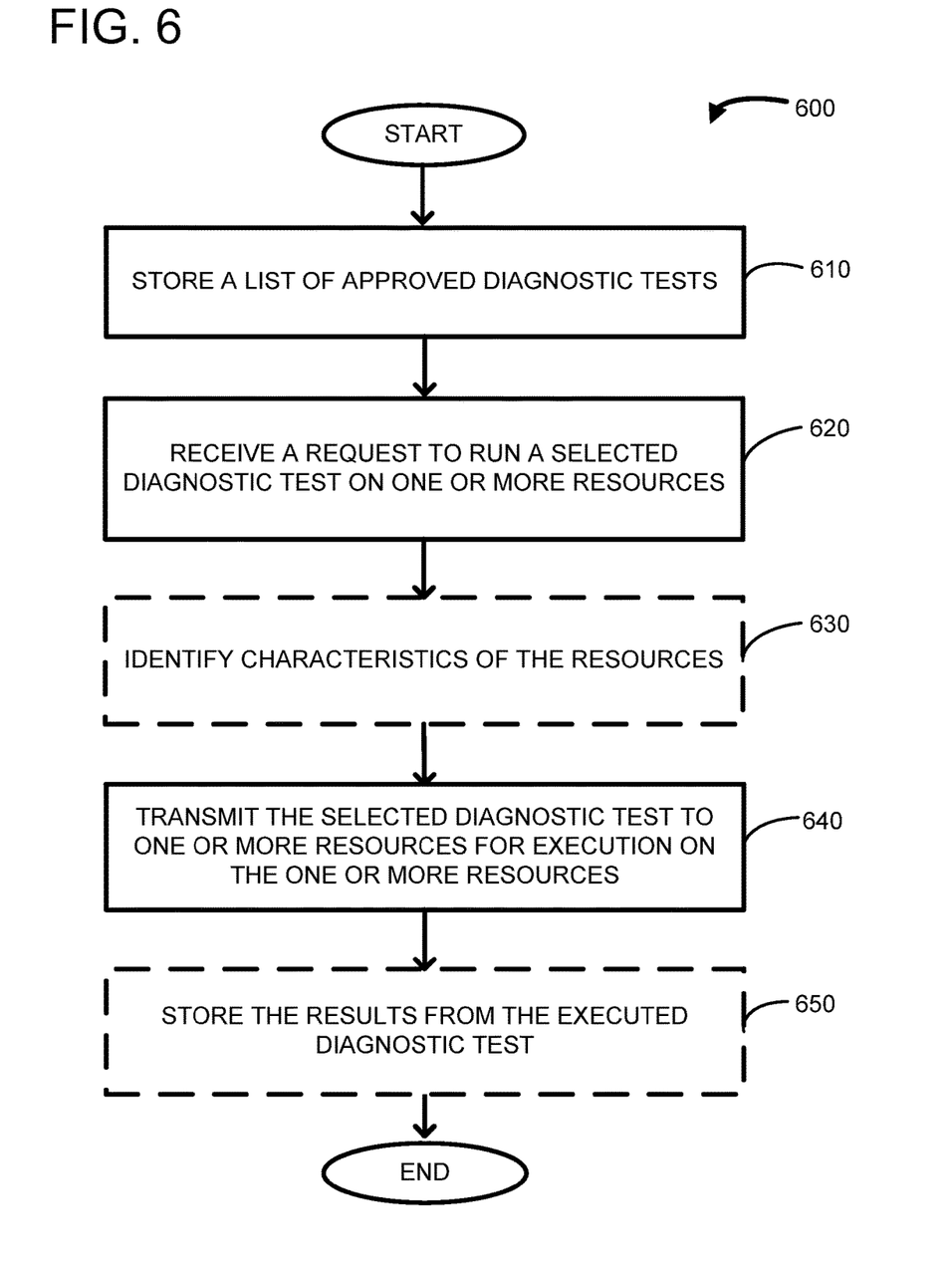
FIG. 6 is a flowchart of a method for providing on-demand diagnostics in a distributed environment, according to one embodiment.

FIG. 6 is a flowchart of an embodiment of a method 600 for providing on-demand diagnostics in a multi-tenant environment. At 610, a list of approved diagnostic tests can be stored. The list of approved diagnostic tests can include all diagnostic tests approved to be executed in the multi-tenant environment. Alternatively, separate lists of approved diagnostic tests can be stored for each user. In other words, the list of approved diagnostic tests can be based on an identity of the user on-demand diagnostics. The list of approved diagnostic tests can include all versions of each approved diagnostic test, only a preferred version of each approved diagnostic test, or a subset of all versions of each approved diagnostic test. The diagnostic tests can be stored with additional data associated with the diagnostic tests, such as a version and an approval status of the diagnostic test, and a list of authorized users or a privilege level of the diagnostic test.

At 620, a request to run a selected diagnostic test on one or more resources in the multi-tenant environment can be received. The selected diagnostic test can be from the list of approved diagnostic tests. The request can be an API request that programmatically identifies the selected diagnostic test. The API request can originate from within the multi-tenant environment (such as from a service of the multi-tenant environment) or from a client device outside of the multi-tenant environment. Thus, the request can originate from a customer or an administrator of the multi-tenant environment. The request can be generated by a user interface that provides interactive content to the user. As one example, the user interface can provide a list of diagnostic tests that the user is authorized to execute. For example, the identity of a user of the on-demand diagnostics can be authenticated, and the list of diagnostic tests provided to the user can be based on the identity of the user. Generally, a request to run a selected diagnostic test on one or more resources in the multi-tenant environment can include a selection of the diagnostic test (including a version of the diagnostic test), characteristics of the resources, a user identifier, a test pool size, a launch time or condition for launching, and a response-type.

At 630, characteristics of the resources can be identified. The characteristics can be identified in the same request as the request to run a selected diagnostic test or in a different request. A list of resources that match the identified characteristics can be generated. The characteristics can include one or more of the following: an instance type, an instance size, a software version, a hardware platform, a usage class, an availability-zone, or a server computer state. Non-limiting examples of instance types include general-purpose instances, compute-optimized instances, memory-optimized instances, storage-optimized instances, input-output-optimized instances, micro-instances, and instances with co-processors. Software versions can include versions of operating systems and application programs. Usage classes can include production resources and spare capacity. Server computer states can include newly-launched, available, suspended, and on-probation, for example.

At 640, the selected diagnostic test can be transmitted to one or more resources. For example, the selected diagnostic test can be transmitted to one or more resources matching the characteristics identified at 630. The selected diagnostic test can be transmitted to all of the resources matching the characteristics or to a subset of the resources matching the characteristics. As one example, the number of resources to transmit the diagnostic test to can be determined by a test-pool size. Transmitting the diagnostic test can include loading the diagnostic test in an agent running in a management layer of the resource in real-time in response to the request at 620 or at a scheduled time received in the request. Transmitting the diagnostic test can include loading the diagnostic test in an agent running in a partition of the hardware resource allocated to a customer.

At 650, the results from the executed diagnostic test can be stored. For example, a unique identifier can be generated for each request to run a selected diagnostic test on one or more resources in the multi-tenant environment. The results can be stored in association with the unique identifier and/or with additional data. The additional data can include a version number of the diagnostic test that was executed, a user identifier associated with the user running the diagnostics, a date and time when the diagnostics were run, a list of the target resources where the diagnostics were run, and any other information that is suitable for auditing, maintaining, or managing the diagnostic service and/or the resources of the multi-tenant environment.

Figure 7:
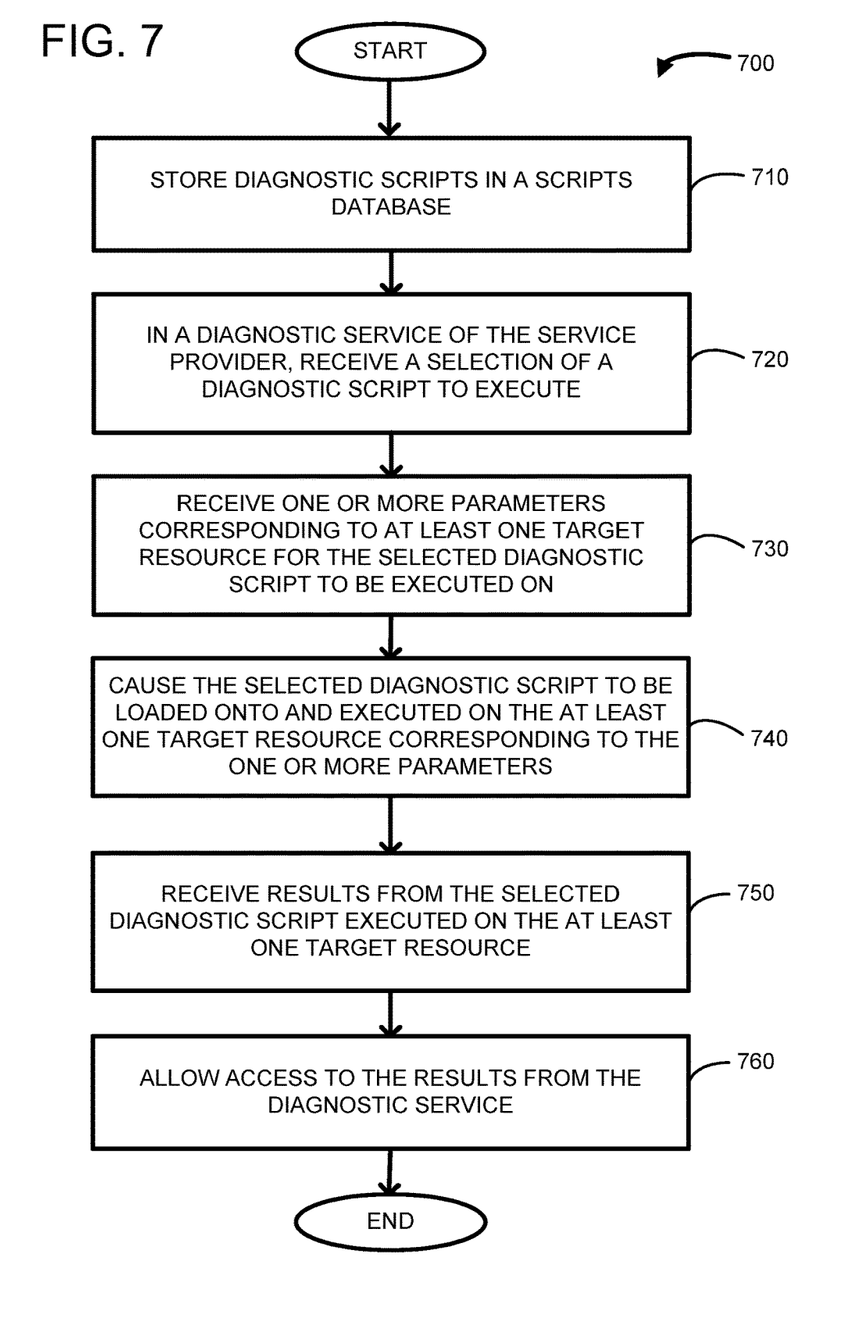
FIG. 7 is a flowchart of a method for providing on-demand diagnostics in a distributed environment, according to another embodiment.

FIG. 7 is a flowchart of an embodiment of a method 700 for providing on-demand diagnostics in a distributed environment. At 710, diagnostic scripts can be stored in a scripts database. At 720, a diagnostic service, such as diagnostic service 110, of the service provider can receive a selection of a diagnostic script to execute from the stored diagnostic scripts. The selection of the diagnostic script to execute can be part of a request to run the selected diagnostic test on one or more resources in the multi-tenant environment. The request can include a user identifier, and the diagnostic service can authenticate an identity of the user of the on-demand diagnostics. The diagnostic service can verify that the user is authorized to execute the diagnostic script. Thus, the diagnostic scripts available to execute can be based on the identity of the user. The request can include other information such as parameters associated with the target resources, a test pool size, a launch time or condition for launching, and a response-type. For example, at 730, one or more parameters can be received. The one or more parameters can correspond to at least one target resource for the selected diagnostic script to be executed on. The one or more parameters can be received through a graphical user interface or an application programming interface including the one or more parameters. The one or more parameters can include characteristics of the target resources including one or more of the following: an instance type, a software version, a hardware platform, a usage class, or a server computer state.

At 740, the diagnostic service can cause the selected diagnostic script to be loaded onto and executed on the at least one target resource corresponding to the one or more parameters. Causing the selected script to be loaded can include loading the selected script in a management layer of the at least one target resource. The management layer can be separate from one or more partitions allocated to users of the service provider. For example, the management layer can be in a privileged domain of the target resource and the user partitions can be in one or more unprivileged domains of the target resource. The script can be executed on the at least one target resource and software executing in the management layer of the target resource can transmit the results to the diagnostic service.

At 750, the diagnostic service can receive results from the selected diagnostic script executed on the at least one target resource. The results can be stored in an audit database. The results can be stored with additional information associated with the results, such as a unique identifier. For example, a unique identifier can be generated for each request to run diagnostics and the results for the corresponding request can be stored in association with the unique identifier. Thus, a query to the audit database for the unique identifier can return results from the request to run diagnostics corresponding to the unique identifier. At 760, the diagnostic service can allow access to the results. For example, the diagnostic service can respond to queries requesting data from the audit database. As another example, the diagnostic service can respond to an API request to run diagnostics by delivering the results via an API response. As yet another example, the diagnostic service can deliver results to a user interface where the results can be displayed to the user.

Figure 8:
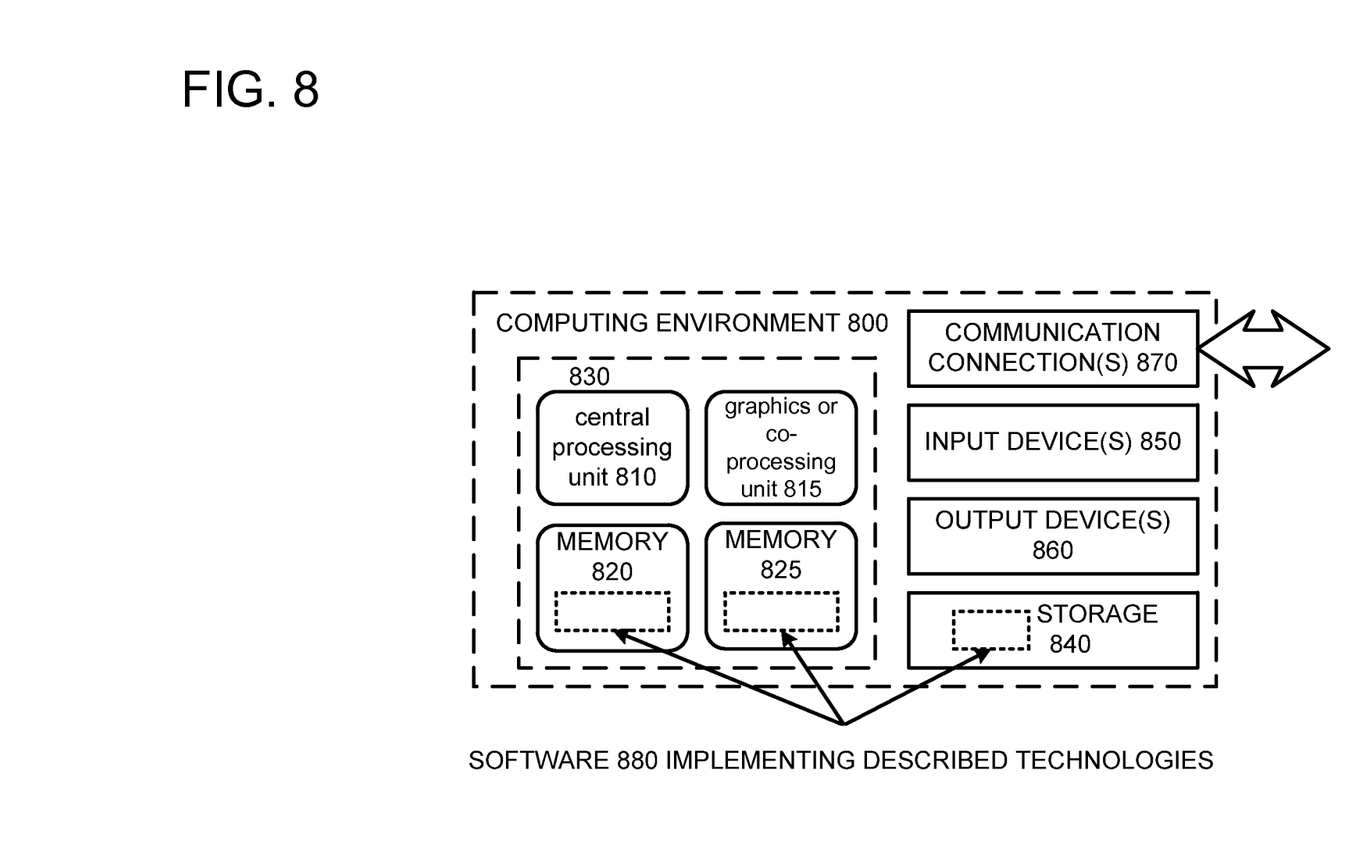
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of providing on-demand diagnostics in a multi-tenant compute service provider, the method comprising:

storing diagnostic scripts in a scripts database, wherein a respective diagnostic script of the diagnostic scripts is configured to diagnose a particular type of compute resource within the compute resources of the multi-tenant compute service provider, and wherein the multi-tenant compute service provider is configured to deliver remote computing and storage capacity as a service to a community of end recipients;

in a diagnostic service of the multi-tenant compute service provider, receiving a user identifier, a selection of a diagnostic script to execute from the stored diagnostic scripts, and a version of the diagnostic script to execute, wherein the user identifier is authorized to use a subset of compute resources from the compute resources of the multi-tenant compute service provider;

receiving one or more parameters corresponding to characteristics of a plurality of compute resources of the multi-tenant compute service provider;

using the diagnostic service to select a subset of target compute resources from the subset of compute resources authorized to be used by the user identifier, the subset of target compute resources having characteristics matching the one or more parameters from the plurality of the compute resources of the multi-tenant compute service provider for the selected diagnostic script to be executed on;

in response to receiving the selection of the diagnostic script, generating a unique identifier associated with the selected diagnostic script;

causing the selected diagnostic script to be transmitted to and executed on the subset of target compute resources corresponding to the one or more parameters;

receiving results in the diagnostic service from the selected diagnostic script executed on the at least one target compute resource;

storing the results from the executed diagnostic script in an audit database in association with the unique identifier and in association with the version of the executed diagnostic script; and allowing access to the results from the diagnostic service.

2. The method of claim 1, further comprising loading the selected script in a management layer of a respective resource of the subset of target compute resources, the management layer separate from one or more partitions allocated to users of the multi-tenant compute service provider.

3. The method of claim 1, further comprising authenticating a user of the on-demand diagnostics and, wherein the diagnostic scripts available to execute are based on an identity of the user.

4. The method of claim 1, wherein receiving the one or more parameters is through a graphical user interface or an application programming interface including the one or more parameters.

5. The method of claim 1, wherein the one or more parameters corresponding to the subset of target compute resources includes characteristics of respective target compute resources including one or more of the following: an instance type, a software version, a hardware platform, a usage class, or a server computer state.

6. A computer-readable storage including instructions thereon for executing a method of providing on-demand diagnostics in a multi-tenant computing environment, the method comprising:

storing a list of approved diagnostic tests, wherein the approved diagnostic tests are executable on the multi-tenant computing environment, the multi-tenant compute environment being configured to deliver computing and storage capacity as a service to a community of end recipients, and a respective diagnostic test of the approved diagnostic tests is configured to diagnose a particular type of hardware resource within the multi-tenant compute environment;

in a diagnostic service running in the multi-tenant computing environment, receiving a request to run a selected version of a diagnostic test from the list of approved diagnostic tests on hardware resources in the multi-tenant computing environment matching selected characteristics, the request comprising a user identifier, the diagnostic service selecting a first subset of the hardware resources to execute the selected diagnostic test from a second subset of the hardware resources that are authorized for the user identifier;

in response to the request, generating a unique identifier associated with the selected version of the diagnostic test and dynamically transmitting the selected version of the diagnostic test to the selected first subset of hardware resources in the multi-tenant computing environment; and storing results from the executed diagnostic test in an audit database in association with the unique identifier and in association with the version of the executed diagnostic test.

7. The computer-readable storage of claim 6, wherein dynamically transmitting includes loading the diagnostic test in an agent running in a management layer of a respective hardware resource of the first subset of hardware resources in real-time in response to the request or at a scheduled time received in the request.

8. The computer-readable storage of claim 6, wherein receiving the request includes receiving an application programming interface (API) request that programmatically identifies the selected diagnostic test.

9. The computer-readable storage of claim 6, wherein the selected characteristics of the hardware resources include one or more of the following: an instance type, a software version, a hardware platform, a usage class, or a server computer state.

10. The computer-readable storage of claim 6, the method further including providing a notification when the results are stored.

11. The computer-readable storage of claim 6, the method further including authenticating a user of the on-demand diagnostics and, wherein the list of approved diagnostic tests is based on an identity of the user.

12. The computer-readable storage of claim 11, wherein the user of the on-demand diagnostics is a customer of the multi-tenant computing environment, and wherein dynamically transmitting includes loading the diagnostic test in an agent running in a partition of a respective hardware resource of the first subset of hardware resources allocated to the customer.

13. A system for providing on-demand diagnostics in a multi-tenant computing environment, the system comprising:

a plurality of computing resources accessible by a plurality of users;

a diagnostic script database including diagnostic tests configured to execute in the multi-tenant computing environment, the multi-tenant compute environment configured to deliver computing and storage capacity as a service to the plurality of users, and a respective diagnostic test of the diagnostic tests being configured to diagnose a particular type of computing resource of the plurality of computing resources;

an audit database for storing on-demand diagnostic results; and a diagnostic service configured to:
- authenticate an identity of a particular user of the on-demand diagnostics of the multi-tenant computing environment;
- receive a request to run a selected version of a diagnostic test from the diagnostic tests on one or more computing resources of the plurality of computing resources;
- in response to the request, generate a unique identifier associated with the selected version of the diagnostic test and dynamically transmit the selected version of the diagnostic test to a first subset of the plurality of computing resources, the first subset selected by the diagnostic service from a second subset of computing resources that the particular authenticated user is authorized to use;
- receive results from the selected version of the diagnostic test executed on the first subset of the plurality of computing resources; and
- store the results from the selected diagnostic test in the audit database in association with the unique identifier and in association with the selected version of the diagnostic test.

14. The system of claim 13, wherein dynamically transmitting includes loading the diagnostic test in an agent running in a management layer of a respective computing resource of the subset of the plurality of computing resources in real-time in response to the request or at a scheduled time received in the request.

15. The system of claim 13, wherein receiving the request includes receiving input from a user through a graphical user interface.

16. The system of claim 13, wherein the selected diagnostic test is dynamically transmitted only if the particular user is authorized to execute the diagnostic test.

17. The system of claim 13, wherein the request further identifies characteristics of the one or more computing resources, the characteristics including one or more of the following: an instance type, a software version, a hardware platform, a usage class, or a server computer state.

18. The system of claim 13, wherein the diagnostic service is further configured to provide a notification when the results are stored in the audit database.

* * * * *